United States Patent [19]

Dimeff

[11] Patent Number: 4,565,097
[45] Date of Patent: Jan. 21, 1986

[54] METHOD AND APPARATUS FOR TRANSDUCER ERROR CANCELLATION

[75] Inventor: John Dimeff, San Jose, Calif.

[73] Assignee: Mark Telephone Products, Inc., Santa Clara, Calif.

[21] Appl. No.: 608,607

[22] Filed: May 9, 1984

[51] Int. Cl.⁴ .............................................. G01L 1/18
[52] U.S. Cl. ....................................... 73/765; 73/766; 73/708; 323/367
[58] Field of Search .................. 73/765, 766, 708; 323/367; 324/DIG. 1

[56] References Cited

U.S. PATENT DOCUMENTS

| | | | |
|---|---|---|---|
| 3,273,382 | 9/1966 | Fonash | 73/766 |
| 3,290,928 | 12/1966 | Curry | 73/766 |
| 3,303,695 | 2/1967 | Laimins et al. | 73/708 |
| 4,333,349 | 6/1982 | Mallon et al. | 73/708 |

FOREIGN PATENT DOCUMENTS 2755211 6/1979 Fed. Rep. of Germany ........ 73/708

OTHER PUBLICATIONS

High Speed Aerodynamics and Jet Propulsion, High Speed Problems Aircraft and Experimental Methods, Princeton, N.J., Princeton University Press published 1961.

Primary Examiner—Anthony V. Ciarlante
Attorney, Agent, or Firm—Townsend and Townsend

[57] ABSTRACT

A transducer unit comprised of a pair of transducers coupled together in a manner such that the offsets, drifts and the like of the circuit elements of one transducer are opposed by and cancelled out by the circuit elements of the other transducer. The transducers can be in the form of Wheatstone bridges and each of the branches of the bridge contains a circuit element of each transducer, respectively, the circuit elements of the branches of the transducer unit being in opposition to each other so as to cancel out the effects due to temperature, acceleration, aging and the like.

15 Claims, 3 Drawing Figures

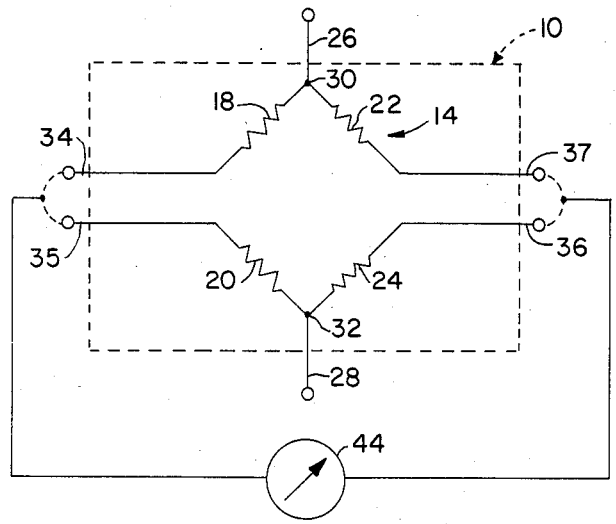
FIG.1
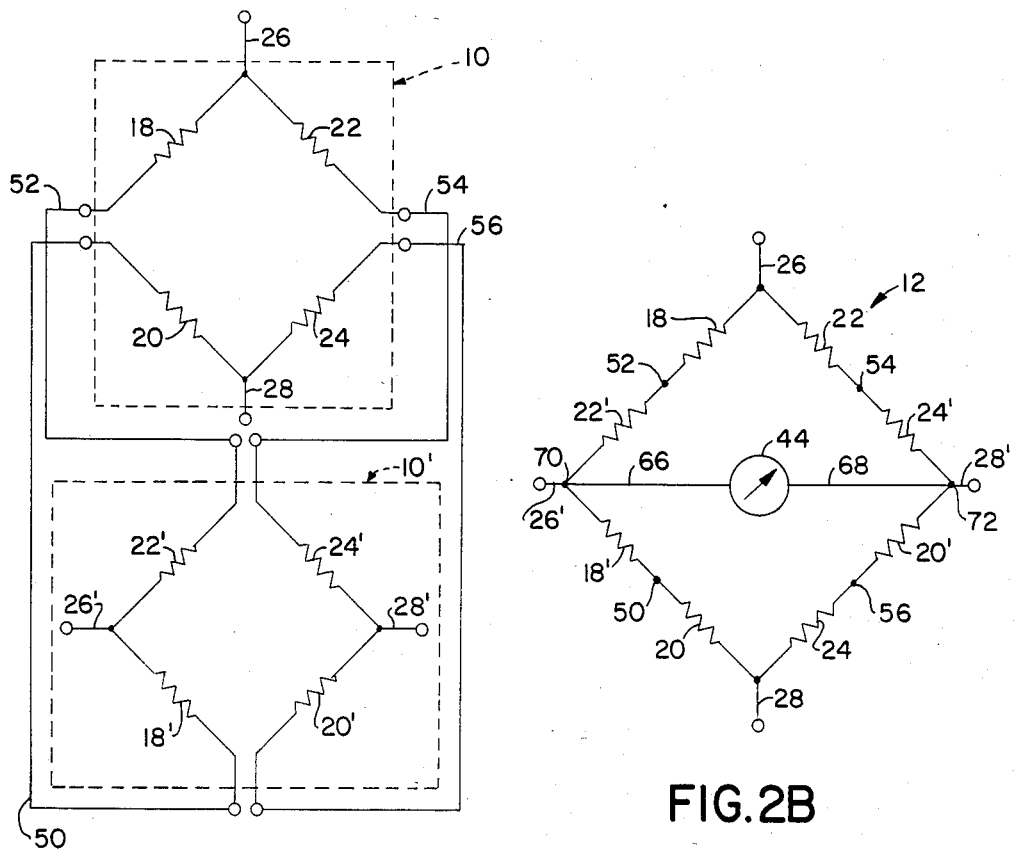
FIG.2A
FIG.2B

METHOD AND APPARATUS FOR TRANSDUCER ERROR CANCELLATION

BACKGROUND OF THE INVENTION

1. Field of the Invention

This invention relates generally to compensation for unwanted effects in a transducer comprised, for example, of one to four elements arranged as parts of a Wheatstone bridge.

2. Description of the Prior Art

On the market today are a variety of sensing devices, or as they are more commonly called, transducers, capable of providing an indication of stimuli. Many incorporate electrical elements that are subjected to some form of manipulation caused by the physical quantity being sensed, causing a change in their electrical characteristics. Of late it has become common to form the reactive elements of these transducers in integrated circuit form. For example, there is today available a pressure transducer that uses, as the responsive detecting medium, a thin, silicon chip on which has been formed (by conventional deposition processes) a number of resistances which function as strain gauges. The chip is attached to one end of a small cylindrical mount, closing that end. Fluid is introduced to the interior of the cylinder, the pressure of which will cause the chip to deflect somewhat. This deflection creates compressive and tensile forces in the resistances, causing a change in their electrical values. In this manner pressure is measured by the amount of the change of the resistances.

Errors in the fabrication and construction of such transducers tend to cause systemically grouped errors in performance. For example, if one alters element A of a resistive strain gauge also containing elements B, C and D, the power dissipated in that element A is altered, heating of its junctions with external leads is altered, thermoelectric effects are altered, the modulus of elasticity of the sensing member (on which element A is mounted) is altered, etc. Each of these errors is affected by such environmental effects as mounting stresses, temperature, heat transfer and the like. The combination of errors, therefore, produces a sensing device (such as a pressure transducer) which deviates from normal performance in a complicated but systematic manner.

HYPOTHESIS

If the sensing device is produced by a well-controlled manufacturing process, deviant properties are likely to be the result of repeatable errors in the manufacturing process. For example, a transducer element in one geographic portion of the diffusion oven is likely to see a different concentration of the dopant than a sensor in another portion of the oven. Two transducers comprising a proximate pair, however, will be exposed to similar dopant concentrations, similar gradients in concentration, similar temperatures, similar errors in positioning relative to masks and deposition sources and the like. Because of these similarities, the two transducers are likely to have similar deviation from their ideal electromechanical characteristics, leading through complicated relationships between asymmetry and circuit error—to similar deviations in their performance characteristics.

SUMMARY OF THE INVENTION

Tests on a number of pressure transducers from a large group of transducers rejected for normal usage because of excessive initial unbalance, etc. proved the above hypotheses to be valid. The transducers were paired according to initial unbalance and strain gauge bridge resistance and then were interconnected to form a single Wheatstone bridge containing eight separate bridge elements. The elements of one transducer were connected in the same portion of the bridge with an opposing element of the other transducer so that the offsets, drifts and the like of one transducer were opposed by and largely cancelled by those of the other transducer. Since the pressure was applied to only one of the pair of transducers, however, it produced an output which was not cancelled by the other. By being connected in this manner, the reject pair of transducers perform better than a single transducer that meets all initial performance criteria. This is the conception on which the present invention is based.

In the present invention, to obtain compensation for the above-mentioned unwanted effects in a transducer, two transducer are combined, for example, to form a single transducer, such as a Wheatstone bridge, making connections in such a way that all effects from the two transducers would normally be in opposition to one another so that, if they were both subjected to variations of the same polarity, their respective signals would cancel each other. Thus, no output signal would result. If, for example, the pair of transducers were both subjected to temperature, they would drift in the same way, since they are chosen to have the same general characteristics so that one temperature signal would cancel the other temperature signal.

In the use of the present invention, the physical quantity being sensed, for instance, pressure, is applied to only one of the two transducers. Therefore, the combined transducer sees similar effects in all respects except for the quantity being measured, since the similar effects of one transducer are connected so as to cancel the same effects of the other transducer. The unwanted effects due to temperature, aging, sensitivity to applied power or whatever, of one transducer then basically compensates for the effects of the other transducer, and a signal is obtained that is more purely responsive to the desired stimulus.

The primary object is, therefore, to provide an improved transducer which is formed by a pair of transducers of similar construction, in such a manner to compensate for unwanted effects in the transducers, such as the effects due to pressure, temperature, aging, sensitivity to applied power and the like so that the result is a signal output from the circuit which is substantially totally responsive to the desired stimulus and substantially nothing else.

Other objects of this invention will become apparent as the following specification progresses, reference being had to the accompanying drawing for an illustration of the invention.

IN THE DRAWINGS

FIG. 1 is a schematic view of a typical transducer whose responsive elements are connected in Wheatstone bridge configuration for measuring a variable parameter, such as pressure, the bridge being uncompensated; and FIGS. 2A and 2B are schematic views of a transducer of the present invention in the form of a Wheatstone bridge and being compensated in accordance with the teachings of the invention.

DETAILED DESCRIPTION OF THE PREFERRED EMBODIMENT

Transducers to which the present invention is directed typically include responsive element connections that form a Wheatstone bridge having four branches and a signal indicator, the bridge being coupled to a source of power. The Wheatstone bridge functions to measure a physical quantity, such as pressure. The four branches of the bridge are compensated in a manner hereinafter described to eliminate unwanted effects when measuring a particular physical quantity, such as pressure. Such unwanted effects include those due to acceleration, temperature, aging, sensitivity to applied electrical power and the like.

Illustrated in FIG. 1, in representative and schematic form, is a transducer 10, including resistive elements 18, 20, 22 and 24. Electrical leads 26 and 28 respectively connect at 30 and 32 to connected pairs of resistive elements 18, 22 and 20, 24, while electrical leads 34, 35, 36 and 37 respectively connect to the free ends of resistive elements 18, 20, 22 and 24, as shown. The electrical leads are made available to a user for connection in any desired manner. Such connections typically include a source of electrical power connected to the electrical leads 26 and 28, while respective pairs of the electrical leads 34, 35 and 36, 37 are joined together as 40 and 42, forming a Wheatstone bridge 14, across which, from the connections at 40 and 42, is connected a signal indicator 44.

The resistive elements 18, 20, 22 and 24 of the Wheatstone bridge 14 are formed on a planar substrate (not shown) and mounted in a support mechanism that allows the substrate to be subjected to the pressure to be measured. The pressure causes the substrate to deform, inducing compressive and tensile forces in the resistive elements, and effecting a change in their electrical characteristics. Typically, placement of the resistive elements 18 and 24 on the substrate is such that their response to the pressure is in a similar fashion to each other, while resistive elements 20 and 22 are placed to respond similarly to the pressure, but in an opposite sense to that of resistances 18 and 24.

Referring now to FIG. 2A, a second transducer 10', containing resistive elements 18', 20', 22', and 24', is selected and connected to transducer 10 by electrical connections 50, 52, 54 and 56, in the manner shown. The result of the connections of FIG. 2A is shown clearer in FIG. 2B. The method of selecting transducer 10' is not arbitrary. Rather, the transducer 10' is selected to contain resistive elements that change with environmental effects in a manner substantially similar to the resistive elements of transducer 10, but in a manner so that the transducers can be interconnected to allow the errors of transducer 10' to cancel those of 10. For example, if the resistive element 18 of transducer 10 varies a positive R ohms with a temperature variation of T, the transducer 10' will have to be selected to have (1) a resistive element 22' that varies substantially the same amount but in an opposing direction, (2) a resistive element 18' that changes in substantially the same manner, (3) a resistive element 24' that changes in substantially the same manner, or (4) a resistive element 20' that changes the same amount in an opposing direction.

The result of the interconnection of the two transducers 10 and 10' is the compensated transducer of the present invention, denoted by the numeral 12 (FIGS. 2A and 2B). As better seen in FIG. 2B, the compensated transducer 12 has the same resistive elements 18, 20, 22 and 24 and is coupled to leads 26 and 28. Also, signal indicator 44 is connected by leads 66 and 68 to common points 70 and 72. The compensation aspect of transducer 12 includes the second transducer 10' comprised of resistive elements 18', 20', 22' and 24'. Resistive element 22' is in series with resistive element 18 and resistive element 24' is in series with resistive element 22. Resistive element 18' is in series with resistive element 20 and resistive element 20' is in series with resistive element 24. Resistive elements 18' and 22' are coupled to point 70, and elements 20' and 24' are coupled to point 72.

Resistive elements 18', 20', 22' and 24' compensate for the unwanted effects in elements 18, 20, 22 and 24, respectively. Moreover, elements 18', 20', 22' and 24' are preferably formed in the same manner as elements 18, 20, 22 and 24. For instance, if resistive elements 18, 20, 22 and 24 are defined by being diffused onto a silicon chip in a common diffusion process, then elements 18', 20', 22' and 24' are also formed in the same manner.

The resistive elements 18 and 18' will respond nearly identically in the two different arms of the compensated transducer 10. Thus, for example, if a temperature change causes the resistive element 18 to experience a resistance change, the resistive element 18' will also experience substantially the same change. However, because of the relative locations of the resistive elements 18 and 18' in the bridge so formed, a change in one will be cancelled by the change in the other. Similarly, elements 20 and 20' will respond nearly identically, elements 22 and 22' will respond nearly identically, and elements 24 and 24' will respond nearly identically. Each of these pairs may have large errors associated with them but they would be nearly identical errors which would be compensated for or cancelled out when power is applied across leads 26 and 28.

Assuming that the compensated transducer 12 is used for measuring pressure, the first transducer 10 (having resistive elements 18, 20, 22 and 24) will be subjected to pressure, but pressure will not be applied to the second transducer 10' (having resistive elements 18', 20', 22' and 24'). When pressure is applied to the first transducer 10, stresses will be induced that cause the resistances of resistive elements 18 and 24 increase and the resistances of resistive elements 20 and 22 decrease (or vice versa, depending on whether the pressure is positive or negative). Since no pressure is applied to the second transducer 10', resistive elements 18', 20', 22' and 24', even though they are electrically connected to resistive elements 18, 20, 22 and 24, will remain undisturbed by the pressure applied to the first transducer. Thus, the only unbalance of the compensated transducer 12 that results from the application of pressure on the transducer 10 containing elements 18, 20, 22 and 24.

However, the first and second transducers 10 and 10' together (as the compensated transducer 12) see other changes, such as a change in temperature. When this occurs, each of the elements of the first and second transducers 10 and 10' changes temperature, each one being in one of the branches of the Wheatstone bridge formed by their combination—the compensated transducer 12 of FIGS. 2A and 2B. Any changes in the electrical characteristics of the resistive elements 18', 20', 22' and 24' of the second transducer 10' will tend to cancel the corresponding changes in the resistive elements 18, 20, 22 and 24 of the first transducer 10. Thus, element 18' of the second transducer tends to cancel the temperature and other unwanted effects of the corresponding element 18 of the first transducer 10. This is based on the assumption that a group of characteristics tend to go together so that they are selected for an off-balance condition. Other resistive elements of the second transducer 10' cancel the temperature and other unwanted effects of the corresponding resistive elements of the first transducer.

Compensation of a transducer may not be necessary. For example, if a transducer is off-balance by only one or two millivolts, the transducer may be reliable and not need compensation. However, if it is off-balance by 100 to 200 millivolts, there was probably something wrong in the manufacture of the transducer. For instance, if the transducer is a semiconductor unit, it could have been improperly located relative to the diffusing source or to masks so that the error would show up not only in an unbalance but also in heat conduction problems, temperature strain effects and the like. Thus, the assumption that is made in carrying out the teachings of the present invention is that the errors tend to group together in a family so that one parameter to be measured is selected and the error in a first transducer based upon said parameter is matched with a second transducer so that the other parameters of the first transducer which tend to cause the errors will be cancelled out by the elements of the second transducer.

I claim:

1. A transducer unit substantially free of undesirable circuit effects of the type which change the operation of the transducer comprising:
   first and second transducers of essentially the same construction and matched undesirable circuit effects and each having a number of circuit elements intercoupled to one another to define a signal input and a signal output, a first one of the circuit elements being coupled to a second one of the circuit elements so that a change in a first property of the first circuit element due to said undesirable circuit effects will result in a change in said first property of the second element in an opposite sense.

2. A transducer unit as set forth in claim 1, wherein the intercoupled number of circuit elements of the first and second transducers define a Wheatstone bridge.

3. A transducer unit as set forth in claim 1, wherein the circuit elements of each transducer comprise resistive elements.

4. A transducer unit as set forth in claim 1, wherein the first and second elements of the first transducer is responsive to an externally applied stimulus, the first and second elements of the second transducer being non-responsive to the stimulus.

5. A transducer unit as set forth in claim 4, wherein the stimulus is pressure.

6. A transducer unit, comprising:
   first and second transducers of generally similar construction and having substantially the same operation errors recorded during a standard test, each of the first and second transducers having at least one circuit element responsive to a stimuli causing a property change in said circuit element of a designated sense;
   means for interconnecting said first and second transducers to form said transducer unit and for coupling the one circuit element of the first transducer to that of the second transducer so that the stimuli causing the property change of the designated sense in one of said circuit elements is in opposition to that of the other of the circuit elements.

7. A method of forming a transducer unit that is compensated for output error caused by a circuit element property change induced by an operational response to a stimuli, the method comprising the steps of:
   testing a plurality of transducers to produce tested transducers each having a number of output errors determined by said testing;
   selecting pairs of said tested transducers according to substantial similarity in said output errors;
   connecting said selected transducer pairs to form the transducer unit having an output terminal in a manner that causes the output errors of one of the selected pair of transducers to be in opposing and cancelling relation to the output errors of the other of the selected pair of transducers at said output terminal.

8. The method of claim 7, wherein said individual transducers include a plurality of circuit elements at least one of which is adapted to respond to external stimuli with a change of an electrical characteristic.

9. The method of claim 8, and wherein the connecting step includes the step of coupling the plurality of circuit elements to form a Wheatstone bridge.

10. The method of claim 8, the circuit elements being resistive, and wherein the connecting step includes the step of coupling the circuit elements to form a Wheatstone bridge.

11. A compensated transducer unit, comprising:
    a pair of transducers of substantially the same type and construction and matched to produce a same error signal, each of the transducers having input terminals for receiving an input voltage, output terminals for providing an output signal, a plurality of circuit elements at least one of which is adapted to respond to stimuli in a fashion that results in an output signal appearing at the output terminal when the input voltage is received at the input terminal, and each being operable to produce an error signal at the output terminal in response to a predetermined input voltage being applied to the input terminal, the error voltage produced by a one of the pair of transducers being substantially equal to that produced by the other of the pair of transducers;
    means for coupling the respective circuit elements of the pair of transducers together, forming the transducer unit having second input terminals and second output terminals, in a manner that places the error signal of the one transducer in opposition to that of the other transducer to cause cancellation thereof at the second output terminals.

12. The transducer unit of claim 11, wherein at least a first one of the plurality of circuit elements of each of the pair of transducers responds to a stimuli to cause said error signal, and wherein the first one of the circuit elements of the pair of transducers are intercoupled by the coupling means to place them in a predetermined relation to cause the error signal produced by a one of the first one of circuit elements to be substantially opposite in phase and amplitude to that of the other of the first circuit elements.

13. The transducer unit of claim 12, wherein the circuit elements of each of the pair of transducers are interconnected by the coupling means to form a Wheatstone bridge.

14. The transducer unit of claim 13, wherein the circuit elements of the pair of transducers are interconnected by the coupling means to create at least four pairs of series-connected circuit elements, each pair of circuit elements forming one leg of the Wheatstone bridge.

15. The transducer unit of claim 11, wherein only one of the pair of the transducers is subjected to a physical quantity having a parameter desired to be sensed by the transducer unit.

* * * * *